July 30, 1957
E. D. LINDBLOM
2,800,706
METHOD OF MANUFACTURING BLADE RINGS FOR
RADIAL FLOW ELASTIC FLUID MACHINES
Filed Sept. 15, 1953
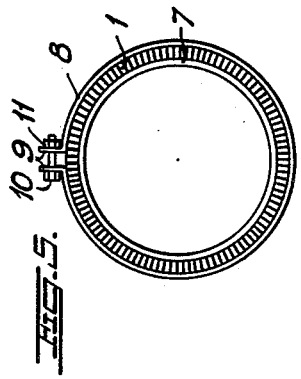
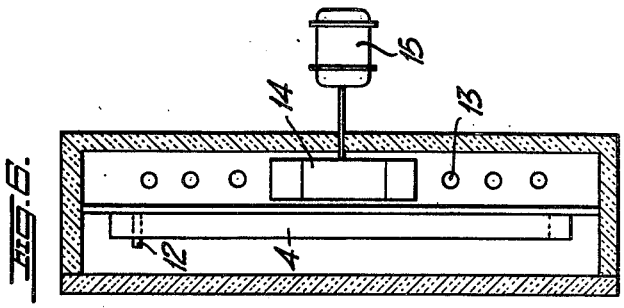
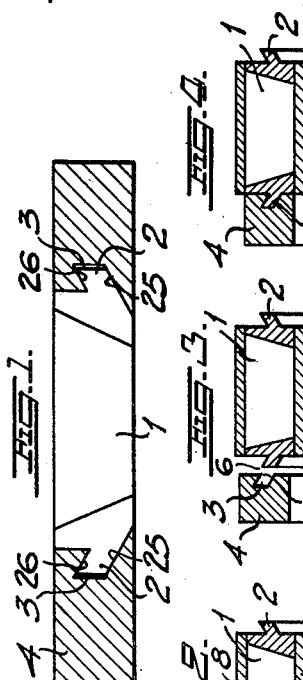
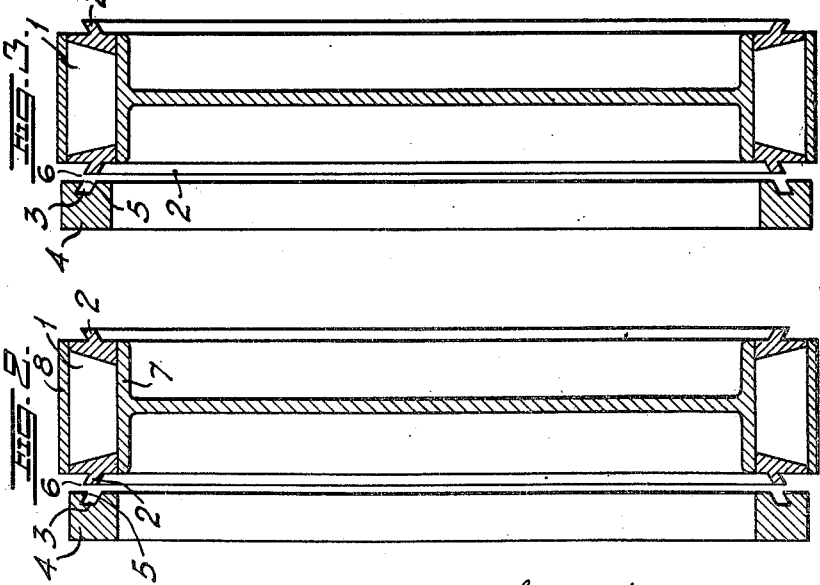
Inventor
Erik David Lindblom
by Sommers & Young
Attorneys

2,800,706

METHOD OF MANUFACTURING BLADE RINGS FOR RADIAL FLOW ELASTIC FLUID MACHINES

Erik David Lindblom, Finspong, Sweden

Application September 15, 1953, Serial No. 380,181

Claims priority, application Sweden October 17, 1947

4 Claims. (Cl. 29—156.8)

The present application is a continuation-in-part of my co-pending, abandoned application Serial No. 11,456, filed February 27, 1948, which relates to improvements in blade rings for radial flow elastic fluid machines and method of manufacturing same.

The present invention relates to the method of manufacturing such blades set forth in said application which includes assembling the blades and the supporting rings of a blade ring by causing a difference in temperature between the blades and the supporting rings with a view to obtaining a shrink fit therebetween.

By such an assembling method the use of welding or rolling operations for satisfactorily connecting the blades to the supporting rings may be avoided, thereby allowing the manufacture of said elements, and especially the blades, from such material as is considered the best one from strength and corrosion point of view. At the choice of such a material no attention need be paid to such conditions as had to be satisfied by the material, if a welding or rolling operation were to be practiced.

A feature of the invention involves collecting the blades for a blade wheel as a circular set of a diameter as determined by the blade wheel to be manufactured, forming oblique projections on the feet of the blades by cutting outwardly widened conical flanges on opposite sides of said circular set of blades while held in this state, subjecting supporting rings having correspondingly conical grooves for receiving said flanges of projections to a sufficient temperature for increasing their diameter until the diameter of the open ends of the grooves is equal to the diameter of the end surfaces of the flanges of projections, placing the hot supporting rings on opposite sides of the set of blades so as to position the ends of the flanges of projections into register with the open ends of the grooves, and forcing the supporting rings axially towards the set of blades so as to cause the flanges of projections to gradually enter the grooves according as the supporting rings are getting cool.

According to another feature of the invention the supporting rings are maintained at normal temperature while the blade rings are cooled down until the outer ends of the conical projections thereof are in axial alinement with the open ends of the grooves of the supporting rings located on opposite sides thereof, whereupon the supporting rings are forced axially towards the set of blades so as to cause the projections of the blades to gradually enter the grooves of the supporting rings according as the diameter of the set of blades increases with increasing temperature as a result of the blades being allowed to return to their normal temperature.

A still another feature of the invention involves both heating the supporting rings and cooling down the set of blades for readily obtaining such diameters of the supporting rings and set of blades as are necessary for allowing the projections of the blades to initially engage the grooves of the supporting rings.

According to a further feature of the invention the forcing of the supporting rings axially against the circular set of blades is effected by a hammering operation.

In the accompanying drawings,

Fig. 1 is an axial section of part of a blade ing manufactured by the method according to the invention;

Fig. 2 is an axial section of a set of blades as collected in a clamping device to form a circular set and a supporting ring at one side thereof, when all of said elements are of the same, say normal, temperature, Fig. 3 is a similar section of same members with the supporting ring heated to allow commencement of the assembling operation;

Fig. 4 is a similar section showing the engagement between the supporting ring and the set of blades completed;

Fig. 5 is an end view of the clamping device with the blades inserted therein and, Fig. 6 is a substantially diagrammatic section of an electric furnace for the heating of supporting rings.

With reference to Fig. 1, the numeral 1 designates a blade formed with an integral root at each end and a projection 2 thereon. Each such projection engages a correspondingly shaped groove 3 of a supporting ring 4. In the example shown the circumferential bounding surfaces of the projections 2 or the grooves 3, indicated at 25 and 26, are parallel to each other and extend in an oblique direction outwardly looking from inside the blade ring.

Figs. 2–4 illustrate how to assemble blades and collecting rings to form a blade ring according to a preferred embodiment of the invention.

In Fig. 2 the numeral 7 indicates the cylindrical rim of a disc of a fixed diameter acting as a carrier for the set of blades required for a blade ring. Said rim 7 is of such a diameter that the set of blades when at normal temperature is the same diameter as in the blade ring to be manufactured. The blades 1 collected around the rim 7 are held in place thereon by means of a clamping ring 8 surrounding the set of blades which is slit and formed with radially upturned ends 9 which may be drawn together by means of a threaded bolt 10 and a nut 11, as shown in Fig. 5. By this means the set of blades 1 may be held in the same relative position as they should occupy in the finished blade ring.

While the blades are thus clamped to the rim 7 as an annular set the projections 2 are produced by a turning operation, the projections on each side of the set of blades appearing as an outwardly widened conical flange. In the supporting rings 4 correspondingly conical grooves 3 for receiving the projections 4 are formed by a suitable operation.

In Figs. 2–4 the operation in assembling a set of blades and one supporting ring is illustrated, the other supporting ring being not shown, since the operation in connection therewith is similar to that of the supporting ring shown.

In order to attach the supporting ring to the set of blades, the supporting ring is subjected to a heating, for instance, in a furnace of the construction shown in Fig. 6. Of course, any appropriate type of furnace may be used for this purpose.

In the furnace illustrated the supporting ring 4 is hanging on a pin 12 and heated by circulating electrically heated air therearound. To this end the furnace contains an electric heating element 13 and a fan blower 14 driven by an electric motor 15 for circulating the air heated by said element. When the temperature of the connecting ring is raised sufficiently to cause such an increase of its diameter that the outermost edge 5 of the groove 3 of the ring 4 is the same diameter as the outermost edge 6 of the respective flange 2 of the set of blades, that is, in the drawing the left hand one, the supporting ring is placed adjacent the set of blades as held in the clamping device 7, 8 coaxially with respect thereto so that the edges 5 and 6 are in axial alinement with each other, as shown in Fig. 3. By moving the supporting ring towards the set of blades, the flange 2 may be caused to engage the open end of the groove 3. According as the temperature of the supporting ring sinks and the diameter of the ring correspondingly decreases, the flange 2 may be caused to gradually enter the groove 3 to its full axial depth by subjecting the supporting ring to an axial force, as by a hammering operation. By this means the supporting ring is shrunk on the flange 2 of the set of blades, so as to be rigidly connected thereto.

The operation above described in respect of the left hand supporting ring, which results in the structure shown in Fig. 4, is then repeated in respect of the right hand supporting ring, not shown. The said last mentioned operation being completed, the blade ring is ready for mounting in the turbine.

It is to be noted that the assembling operation as above described may be carried out without any deformation of the supporting ring or the blades by mechanical means, and there is also no need of any rolling operation for sealing the connection.

In producing the projections 2 and the grooves 3 such proportions may be chosen as to secure any desired initial tension remaining between the blade roots and the supporting rings in the assembled state of the blade ring when the various elements thereof have all returned to normal temperature.

It is already stated hereinbefore that the invention results in advantages concerning the choice of material for the blades and supporting rings. As a further advantage the invention permits the use of a profile of the blade roots and the grooves in the supporting rings which secures a structure of uniform strength, that is to say, a structure in which the blade roots and the supporting rings are of equal strength. Another essential advantage resulting from the invention is an increased resistance to tensional corrosion obtained by a reduction of concentrated stresses and stresses gradients in the outermost edges of the grooves of the supporting rings. It is to be noted that the projections and grooves may take other forms than that shown in the drawing, for instance, such as shown in my co-pending application Serial No. 191,993, without departing from the invention as defined by the annexed claims.

While hereinbefore is described how to connect a supporting ring to an annular set of blades held by a clamping device by heating the supporting ring, it is to be noted that the relative change in diameters of said ring and set required for allowing the initial engagement between the flange 2 and the groove 3 may be obtained by cooling down the set of blades and the associated clamping device while maintaining the supporting ring at normal temperature.

As a further modification of the invention heating of the supporting ring may be combined with cooling of the set of blades for more readily obtaining the equalization of diameters necessary for initiating the assembling operation.

I claim:

1. A method of manufacturing blade rings for radial flow elastic fluid machines which comprises assembling the blades necessary for the manufacture of a blade ring as a circular set of a diameter corresponding to that of the blade wheel to be manufactured, clamping the blades in assembled position forming oblique projections on the feet of the blades by cutting conical flanges on opposite sides of said circular set of blades while so assembled, forming supporting rings with corresponding conical grooves for receiving said flanges of said projections, causing a difference in the temperatures of the supporting rings and the set of blades necessary for effecting changes of the relative diameters of said rings and set of blades of such a degree that the diameter of the open ends of the grooves of the supporting rings becomes equal to the diameter of the end surfaces of the flanges of said projections of said set of blades, applying said supporting rings to opposite sides of and concentric with the axis of the set of blades so as to cause the ends of the flanges of projections to engage the open ends of the grooves, moving the so positioned rings and circular set of blades along their concentric axis toward each other so as to cause said flanges of said projections of the blades to gradually enter the grooves correspondingly as the temperatures of the supporting rings and said set of blades are equalized and the relative diameters of the set of blades and the supporting rings become normal, whereby said blade feet are held in assembled circular relation solely by the engagement of said oblique projections of said blade feet in said corresponding conical grooves in said supporting rings and thereafter removing the clamp.

2. A method of manufacturing blade rings for radial flow elastic fluid machines as claimed in claim 1, in which the change in temperatures of the supporting rings and the set of blades is effected by heating the supporting rings while allowing the set of blades to remain at normal temperature.

3. A method of manufacturing blade rings for radial flow elastic fluid machines as claimed in claim 1, in which the difference in temperatures of the supporting rings and the set of blades is effected by cooling the set of blades while allowing the supporting rings to remain at normal temperatures.

4. A method of manufacturing blade rings for radial flow elastic fluid machines as claimed in claim 1, in which the difference in temperatures of the blade rings and the set of blades is effected by a combined heating of the supporting rings and cooling of the set of blades.

References Cited in the file of this patent

UNITED STATES PATENTS

| | | |
|---|---|---|
| 2,218,722 | Ross | Oct. 22, 1940 |
| 2,224,145 | Dugan et al. | Dec. 10, 1940 |
| 2,293,512 | Levy | Aug. 18, 1942 |